UNITED STATES PATENT OFFICE 2,133,389

1'-CHLORO-1-METHYL-5-NITRONAPHTHA-LENE AND PROCESS FOR MANUFACTURING THE SAME

Otto Hoffmann and Hans Lange, Dessau in Anhalt, Germany, assignors to General Aniline Works, Inc., New York, N. Y., a corporation of Delaware No Drawing. Application November 27, 1937, Serial No. 176,916. In Germany April 3, 1936

4 Claims. (Cl. 260—646)

Our present invention relates to a process for manufacturing 1'-chloro-1-methyl-5-nitronaphthalene of the formula

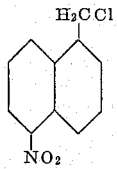

A further object of our invention is the new product corresponding to this formula.

This application is a continuation-in-part of our copending application Serial No. 130,318, filed March 11, 1937.

Chloromethyl derivatives of aromatic hydrocarbons are obtainable according to G. Blanc, Bulletin de la Soc. chim. de France, IVth series, vol. 33, pages 313 to 319, by acting upon the hydrocarbons with polymerized formaldehyde and hydrochloric acid in the presence of a condensing agent such as zinc chloride and of an organic solvent.

According to U. S. Patent No. 1,910,475 1'-chloro-1-methylnaphthalene can be produced by reacting formaldehyde in the absence of an organic solvent and of a condensing agent upon an aqueous suspension of crystallized naphthalene in the presence of concentrated hydrochloric acid. Experiments to produce 1'-chloro-1-methyl-5-nitronaphthalene by reacting 1-nitronaphthalene with formaldehyde and hydrochloric acid failed and in the literature it is expressly denied that the formaldehyde-hydrochloric acid reaction proceeds in the case of nitronaphthalene. (Woroshzow and Jurygina, Chemisches Centralblatt, 1931, II, 1132.)

Contrary to this prior art, we have found that 1-nitronaphthalene is easily accessible to this treatment for introducing chloromethyl groups and that by starting with that compound good yields of 1'-chloro-1-methyl-5-nitronaphthalene are producible when maintaining the following working conditions.

The formaldehyde may be used in form of paraformaldehyde, polyhydroxymethylene or of an aqueous solution of the monomer compounds, about 1.2 to 2.5 mols per mol. nitronaphthalene being present in the reacting mixture. The condensation is to be carried out in the absence of organic solvents, but in an aqueous suspension and in the presence of a condensing agent such as zinc chloride or sulfuric acid. In the case of zinc chloride this condensing agent should be present in an amount corresponding to 0.2 to 1 mol. per 1 mol. water. The condensation is to be carried out at a temperature of about 50° C. to about 70° C. and depending upon the concentration of the condensing agent and the temperature it endures 3 to 25 hours.

The constitution of the end product is settled by its conversion into the known 1.5-nitronaphthoic acid.

The 1'-chloro-1-methyl-5-nitronaphthalene which has not hitherto been known is capable of many-sided reactions and therefore constitutes a valuable intermediate product for making dyes. Thus, for instance, new compounds are obtainable by condensation of the 1'-chloro-1-methyl-5-nitronaphthalene with, for instance, sodium sulfite, whereby ω-methylnaphthalene sulphonic acids are produced. In these compounds the nitro group may be reduced to form an amino group or may be transformed into an OH-group. On the other hand, by saponification or oxidation nitronaphthalene alcohol-aldehyde or carboxylic acid are producible.

An example of the process is as follows:—

173 parts of 1-nitronaphthalene, 75 parts of paraformaldehyde, 75 parts of zinc chloride and 30 parts of concentrated hydrochloric acid are heated together at 65 to 70° C. while stirring and introducing hydrogen chloride during 20 hours. The mixture is then added to water, the whole is filtered by suction and the solid matter washed with water until neutral. After separation of oily impurities by pressure there are obtained 165 parts (75 per cent of the theory) of 1'-chloro-1-methyl-5-nitronaphthalene. When recrystallized from carbon tetrachloride this product melts at 96 to 97° C.

When instead of para-formaldehyde aqueous formaldehyde solution is used the addition of zinc chloride must be increased (400 to 600 parts).

What we claim is:—

1. 1'-chloro-1-methyl-5-nitronaphthalene of the formula

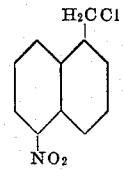

a crystalline product which recrystallized from carbon tetrachloride melts at 96 to 97° C.

2. The process which comprises heating 1-nitronaphthalene in an aqueous medium in the presence of a condensing agent of the group consisting of zinc chloride and sulfuric acid, with 1.2 to 2.5 mols formaldehyde per mol nitronaphthalene and with hydrochloric acid at a temperature of about 50° C. to about 70° C.

3. The process which comprises heating 1-nitronaphthalene in an aqueous medium in the presence of 0.1 mol to 1 mol of zinc chloride per mol water, with 1.2 to 2.5 mols formaldehyde per mol nitronaphthalene and with hydrochloric acid at a temperature of about 50° C. to about 70° C.

4. The process which comprises heating 173 parts of 1-nitronaphthalene, 75 parts of paraformaldehyde, 75 parts of zinc chloride and 30 parts of concentrated hydrochloric acid at 65 to 70° C. while stirring, and introducing hydrogen chloride during 20 hours.

OTTO HOFFMANN.
HANS LANGE.